US010093455B2

(12) United States Patent
Lee (10) Patent No.: US 10,093,455 B2
(45) Date of Patent: Oct. 9, 2018

(54) TONGS FOR SEALING OPENING OF BAG

(71) Applicant: RUBETTY INC., Seoul (KR)

(72) Inventor: Ha Na Lee, Seoul (KR)

(73) Assignee: RUBETTY INC., Seoul (KR)

(*) Notice: Subject to any disclaimer, the term of this patent is extended or adjusted under 35 U.S.C. 154(b) by 0 days.

(21) Appl. No.: 15/312,649

(22) PCT Filed: Jun. 12, 2016

(86) PCT No.: PCT/KR2016/006224
§ 371 (c)(1),
(2) Date: Nov. 20, 2016

(87) PCT Pub. No.: WO2016/200226
PCT Pub. Date: Dec. 15, 2016

(65) Prior Publication Data
US 2018/0099785 A1   Apr. 12, 2018

(30) Foreign Application Priority Data

Jun. 12, 2015 (KR) .................. 10-2015-0083614
Jun. 11, 2016 (KR) .................. 10-2016-0072817

(51) Int. Cl.
*B65D 33/16* (2006.01)
*F16B 2/20* (2006.01)

(52) U.S. Cl.
CPC ............ *B65D 33/1675* (2013.01); *F16B 2/20* (2013.01)

(58) Field of Classification Search
CPC ..... B65D 33/1675; B42F 1/12; Y10T 24/208; Y10T 24/44274; Y10T 24/12; Y10T 24/15; F16B 2/20
See application file for complete search history.

(56) References Cited

U.S. PATENT DOCUMENTS

| | | | | |
|---|---|---|---|---|
| 3,629,905 A * | 12/1971 | Cote | ................. | B65D 33/1675 229/87.09 |
| 3,755,859 A * | 9/1973 | Solari | .................... | A47G 25/48 223/85 |
| 3,823,443 A * | 7/1974 | Takabayashi | .......... | A44B 11/12 24/186 |
| 4,811,465 A * | 3/1989 | Folkmar | ............ | B65D 33/1666 24/30.5 R |

(Continued)

FOREIGN PATENT DOCUMENTS

CN   203033104 U   7/2013
JP   H03-043444 U   4/1991
(Continued)

OTHER PUBLICATIONS

Written Opinion of the International Searching Authority for PCT/KR2016/006224, (dated Sep. 19, 2016).

*Primary Examiner* — Robert Sandy
(74) *Attorney, Agent, or Firm* — The PL Law Group, PLLC (57) ABSTRACT

Tongs for sealing an opening of a bag includes a first body having a first side, a second side and a third side connecting the first and second side, and a second body having a first side, a second side and a third side connecting the first and second side. The first body and the second body are configured to be combined with each other, so that the first body and the second body cover a surface and an opposite surface of the bag configured to cover and seal the opening of the bag.

15 Claims, 10 Drawing Sheets

(56) References Cited

U.S. PATENT DOCUMENTS 4,835,820 A * 6/1989 Robbins, III ...... B65D 33/1675
24/30.5 R
5,212,850 A * 5/1993 Rerolle .................... B42F 1/12
24/543

FOREIGN PATENT DOCUMENTS

| JP | 2000-085797 A | 3/2002 |
| KR | 20-0287678 Y1 | 9/2002 |
| KR | 20-0290380 Y1 | 9/2002 |
| KR | 10-1125887 B1 | 3/2012 |
| WO | 2009-129207 A1 | 10/2009 |

\* cited by examiner

TONGS FOR SEALING OPENING OF BAG

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/006224, filed Jun. 12, 2016, which claims priority to the benefit of Korean Patent Application No. 10-2015-0083614 filed on Jun. 12, 2015 and 10-2016-0072817 filed on Jun. 11, 2016 in the Korean Intellectual Property Office, the entire contents of which are incorporated herein by reference.

TECHNICAL FIELD

The invention relates to tongs for an opening of a bag.

BACKGROUND ART

Recently, a bag formed using synthetic resin is used to receive contents for easy packaging and sales.

For example, liquid product such as a cosmetic sample, a refill shampoo, particulate product such as cereal and sweets, powder product such as refill coffee and detergent and the like are received in the bag for sales.

Like this, a portion of the bag should be cut to use the contents in the bag. In this case, the bag can be thrown away when the contents are all used at once after cutting the bag. However, when the contents are remained in the bag after cutting the bag, it is necessary to seal the opening of the bag to prevent damage and contamination of the contents due to moisture, dust, bacteria, etc. In addition, if the cosmetic sample bag is put on a table after cutting the bag, the contents may flow out to the table and the table gets dirty. Thus, even if the content remains, it is often thrown away.

In the past, tongs having a stick shape is used to seal the bag by nipping the whole opening of the bag using the tongs. Bulk product usually has large opening, so that the traditional tongs may be useful. As references to this, Korean Utility Model Registration No. 20-0290380 and Korean Utility Model Registration No. 20-0287678 are disclosed.

However, a bag having a small capacity such as a sample bag is usually cut at an edge of the bag. In this case, if the tongs having the stick shape is used to seal the opening at the edge of the bag, it is uncomfortable that the tongs protrude to outside and sealing force is decreased.

In addition, Korean Utility Model Registration No. 10-1125887 discloses that a sticker which is attached to a plastic bag. However, attachment and detachment of the sticker is inconvenient, and adhesion of the sticker is getting weaken due to frequent use. Thus, there is a problem that the contents may be leaked outside of the sticker, the contents may be contaminated by adhesive of the sticker, or reuse of the sticker may be hard.

SUMMARY

The present invention is made by keeping in mind the above problems occurring in the related art, and an object of the present invention is to provide a tong for sealing an opening of a bag.

In addition, the present invention also provides a tong having a shape corresponding to an edge of the bag which is capable of sealing a bag by covering the edge of the bag.

In addition, the present invention also provides a tong configured to easy seal or open an opening of the bag.

In addition, the present invention also provides a tong which is easy to carry even though when a bag is folded to seal itself.

To solve these problems, tongs for sealing an opening of a bag according to the present invention includes a first body having a first side, a second side and a third side connecting the first and second side, and a second body having a first side, a second side and a third side connecting the first and second side. The first body and the second body are configured to be combined with each other, so that the first body and the second body cover a surface and an opposite surface of the bag configured to cover and seal the opening of the bag.

In addition, the first side of each of the first and second bodies may be located in parallel with a length direction of a first side of the bag, and the second side of each of the first and second bodies may be located in parallel with a length direction of a second side of the bag, when the tongs nip the bag.

In addition, the first side and the second side of each of the first and second bodies may be perpendicular to each other.

In addition, the third side of each of the first and second bodies may be a straight line.

In addition, the third side of each of the first and second bodies may be a curved line.

In addition, the third side of each of the first and second bodies may have at least one bent portion.

In addition, each of the first and second bodies may have a right-angled triangle shape, and an oblique side of the right-angled triangle shape may be protruded or recessed configured to have predetermined area.

In addition, the tongs may further include a sealing part disposed between the first body and the second body, wherein the sealing part is configured to press the bag.

In addition, the sealing part may include a sealing protrusion formed on a surface of the first body, and a sealing groove formed on a surface of the second body configured to receive the sealing protrusion. At least one or more of the sealing protrusion may be formed.

In addition, the sealing protrusion and the sealing groove may be formed along a length direction of the third side of each of the first and second bodies.

In addition, the sealing protrusion may have a belt shape.

In addition, the second body may have a receiving groove formed between the first and second sides and the sealing groove. The receiving groove may be configured to receive contents which are leaked from the opening of the bag.

In addition, the first body may have an area which is opposite to the receiving groove and is formed by a protrusion wall on the first body.

In addition, an outer surface of the protrusion wall of the first body may make contact with an inner surface of the receiving groove of the second body when the protrusion wall is inserted in the receiving groove.

In addition, the second body has a recess portion which forms a stepped portion with the first and second bodies.

In addition, when the first body and the second body are combined to seal the bag, a gap may be formed between the third side of the first body and the third side of the second body.

In addition, the second side of the first body and the second side of the second body may be connected or combined configured to rotate with respect to each other.

In addition, the tongs may further include a locking part to prevent unwanted separation of the first and second body. The locking part may include locking bump formed at the first or second body, and a locking groove formed at the second or first body to engage with the locking bump.

In addition, the tongs may further include a locking part to prevent unwanted separation of the first and second body. The locking part may include a magnet formed at the first or second body, and a magnetic body formed at the second or first body opposite to the magnet.

In addition, the first or second body may have a handle part extending outer side to have a specific area.

According to an example embodiment of the present invention, the tongs is configured to seal the bag and has a shape corresponding to an edge of the bag, so that a portion of the tongs which is exposed to outside may be minimized.

In addition, according to an example embodiment of the present invention, the opening of the g may be easily sealed or opened.

In addition, according to an example embodiment of the present invention, the sealing part may bend and press the bag, so that sealing force for sealing the opening of the bag may be improved.

In addition, according to an example embodiment of the present invention, the sealing part may have a curved shape, so that the tongs may seal the opening of the bag which is formed in the middle of the bag, as well as the opening formed at the edge of the bag.

In addition, according to an example embodiment of the present invention, the locking part may prevent unwanted opening of the tongs, and may improve the sealing force.

In addition, according to an example embodiment of the present invention, the space for receiving the leaked contents, so that although the contents are leaked from the opening of the bag, the tongs may prevent leakage of the contents outside and may be easily cleared.

In addition, according to an example embodiment of the present invention, the guide member may prevent movement of the bag after the bag inserted.

In addition, according to an example embodiment of the present invention, the stepped portion is formed at the inner side of the second body, so that the bag may be correctly located.

DETAILED DESCRIPTION

Hereinafter, the invention will be explained in detail with reference to the accompanying drawings. The present invention may, however, be embodied in many different forms and should not be construed as limited to the example embodiments set forth herein and shown in accompanying drawings. The same reference numerals will be used to refer to the same or like parts.

Figure 1:
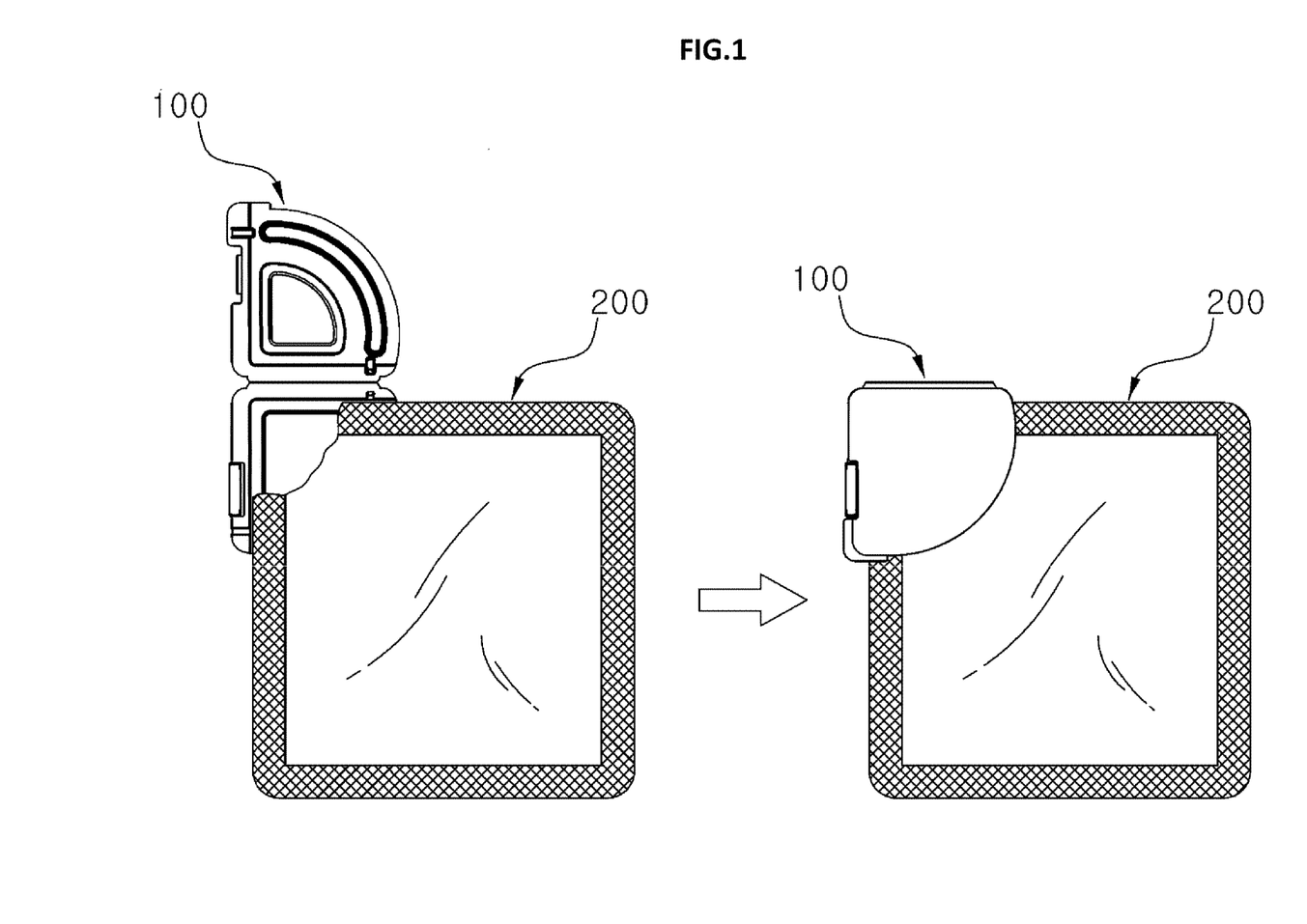
FIG. 1 is a figure illustrating use of tongs for sealing an opening of a bag according to an example embodiment of the present invention.
Figure 2:
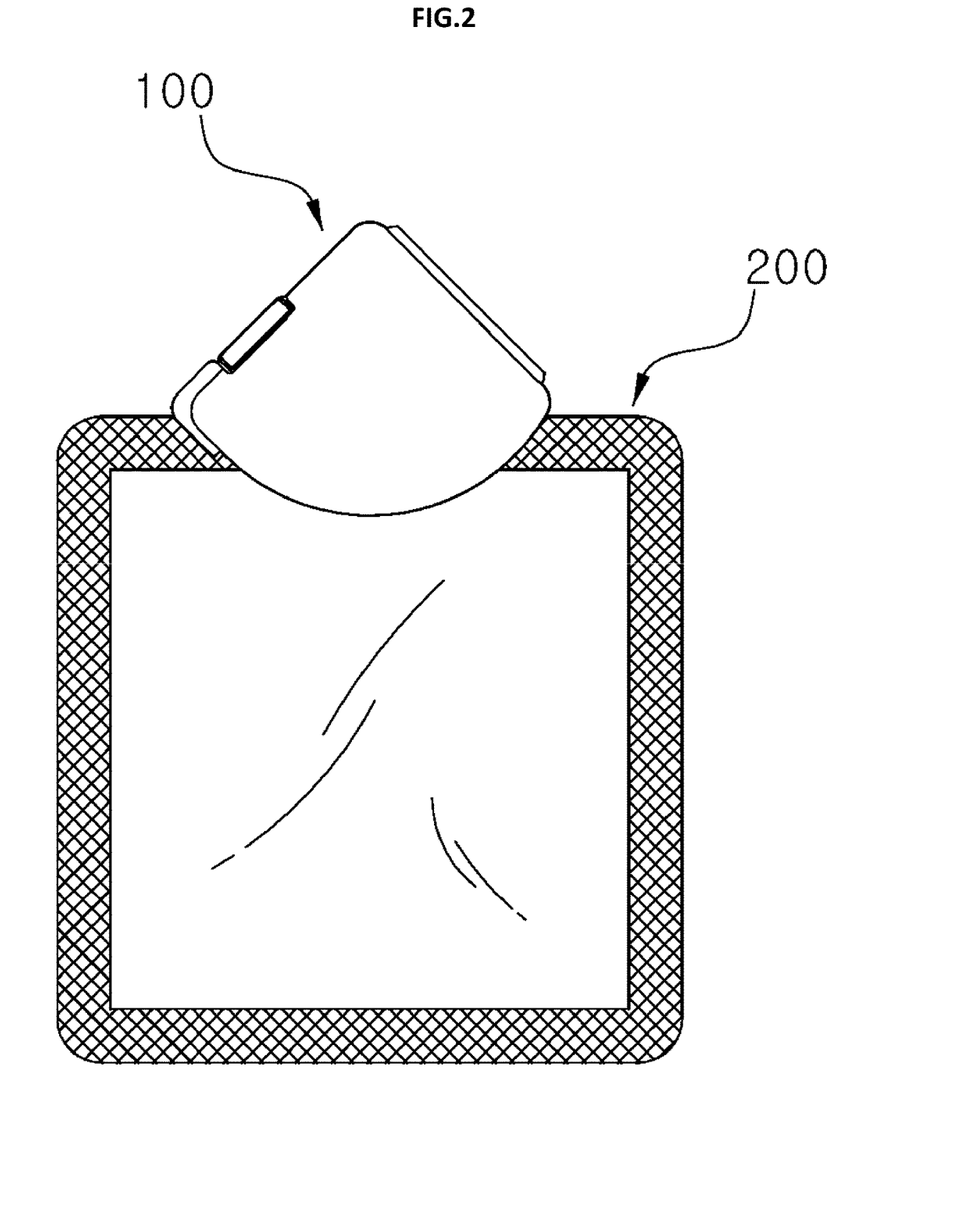
FIG. 2 is a figure illustrating another use of tongs for sealing an opening of a bag according to an example embodiment of the present invention.

FIG. 1 is a figure illustrating use of tongs for sealing an opening of a bag according to an example embodiment of the present invention. FIG. 2 is a figure illustrating another use of tongs for sealing an opening of a bag according to an example embodiment of the present invention.

The tongs for sealing an opening of a bag 100 may surround and seal an opening of a small bag 200 in which liquid contents such as a cosmetic sample and a refill shampoo, other particles or powder content is received.

As described in FIG. 1, when a bag 200 has an opening (no reference mark in the figure, same hereinafter) at the edge of the bag, the tongs 100 is disposed at the edge of the bag 200 and is combined with the bag 200 configured to cover the opening, so that the opening is sealed. Here, the tongs 100 is an exterior formed along an upper boundary and a left boundary of the bag 200, so that the tong 100 may improve sealing force, aesthetics and portability In addition, as described in FIG. 2, when the bag 200 has an opening which is formed at the middle instead of the edge, the tongs 100 may cover and seal the opening of the bag 200. The tongs 100 has a sector form in a plan view, so that the tongs 100 may cover and seal the opening of the bag 200. It is possible that the exterior of the tongs 100 extends to an inner side of the bag 200. In this case, a sealing part 130 which will be mentioned later may have a curved shape, so that e tongs 100 may cover and seal the middle of the bag 200.

Likewise, the tongs 100 according to the present example embodiment may efficiently seal the opening of the bag when the bag is opened at the middle thereof as well as when the bag is opened at the edge thereof.

Figure 3:
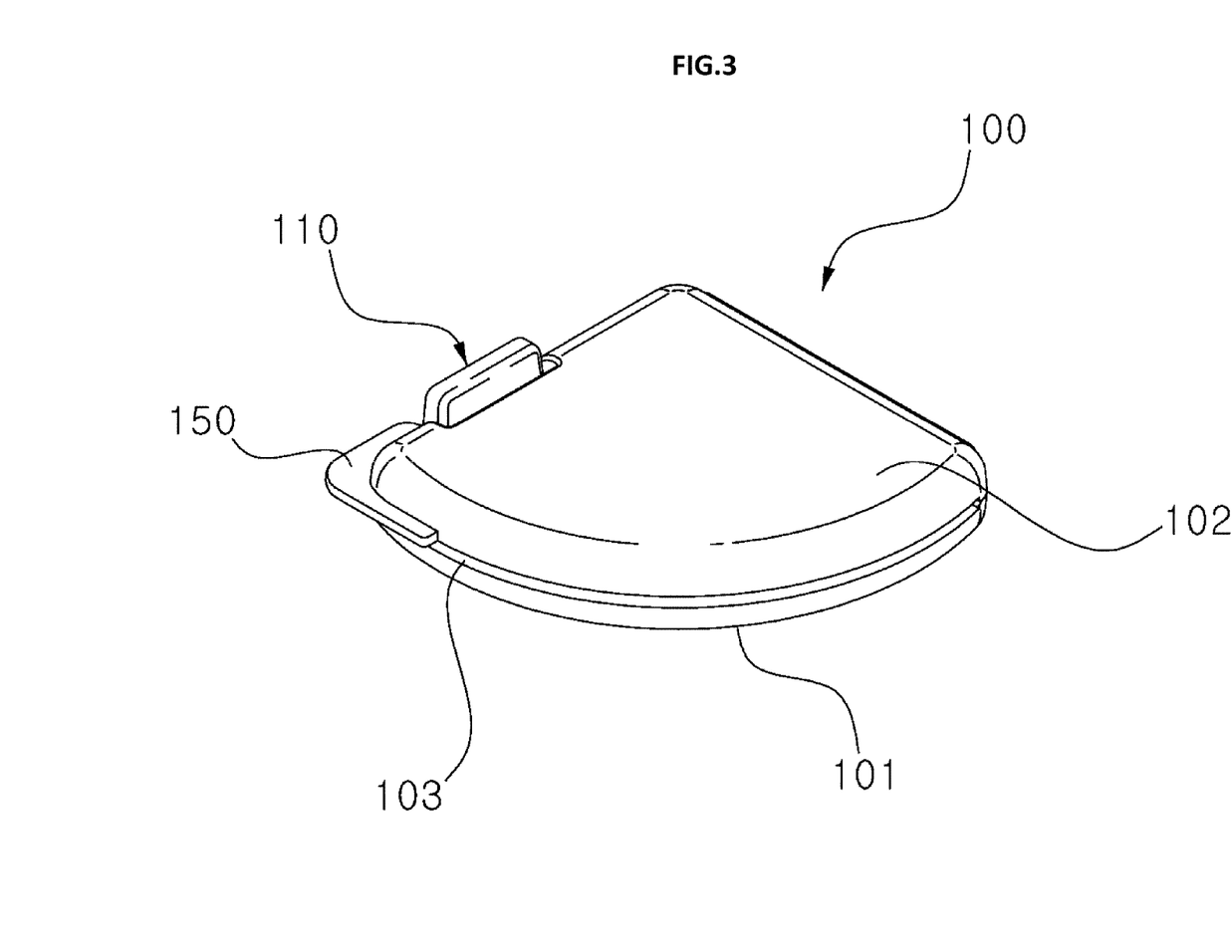
FIG. 3 is a perspective view illustrating the tongs of FIGS. 1 and 2.
Figure 4:
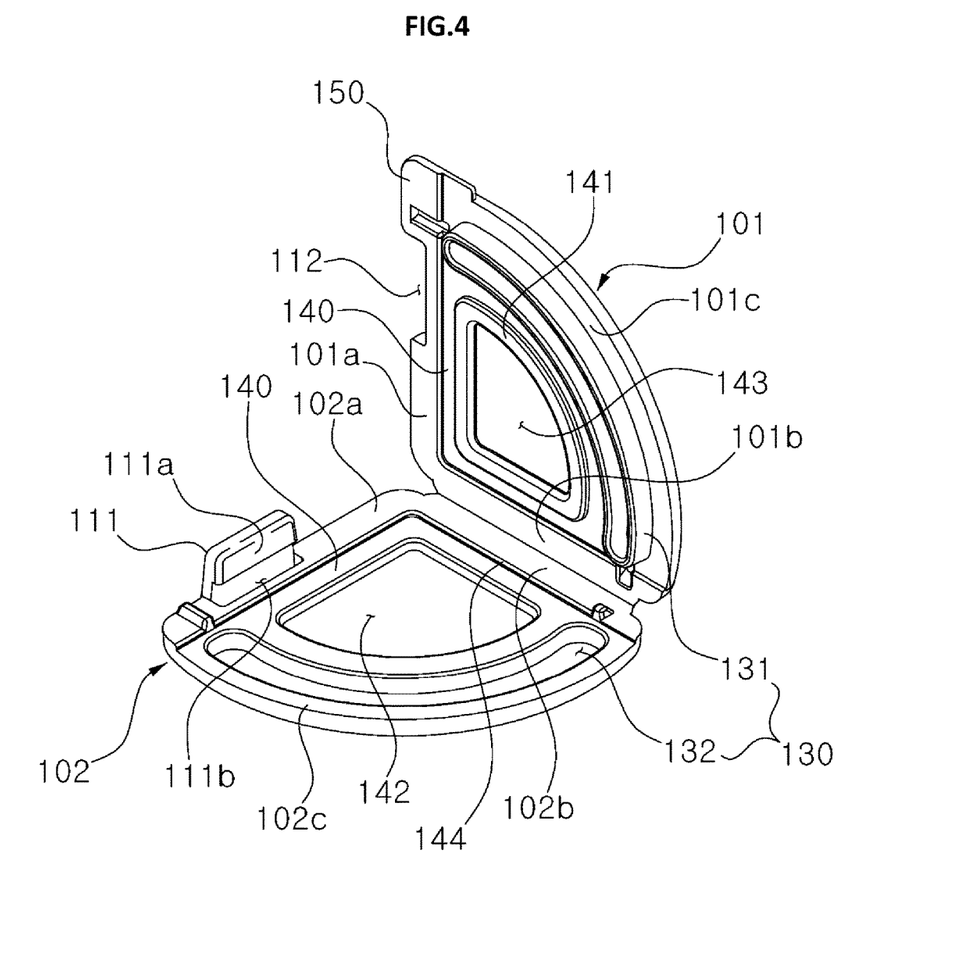
FIG. 4 is a perspective view illustrating the tongs of FIG. 3 when the tongs are opened.
Figure 5:
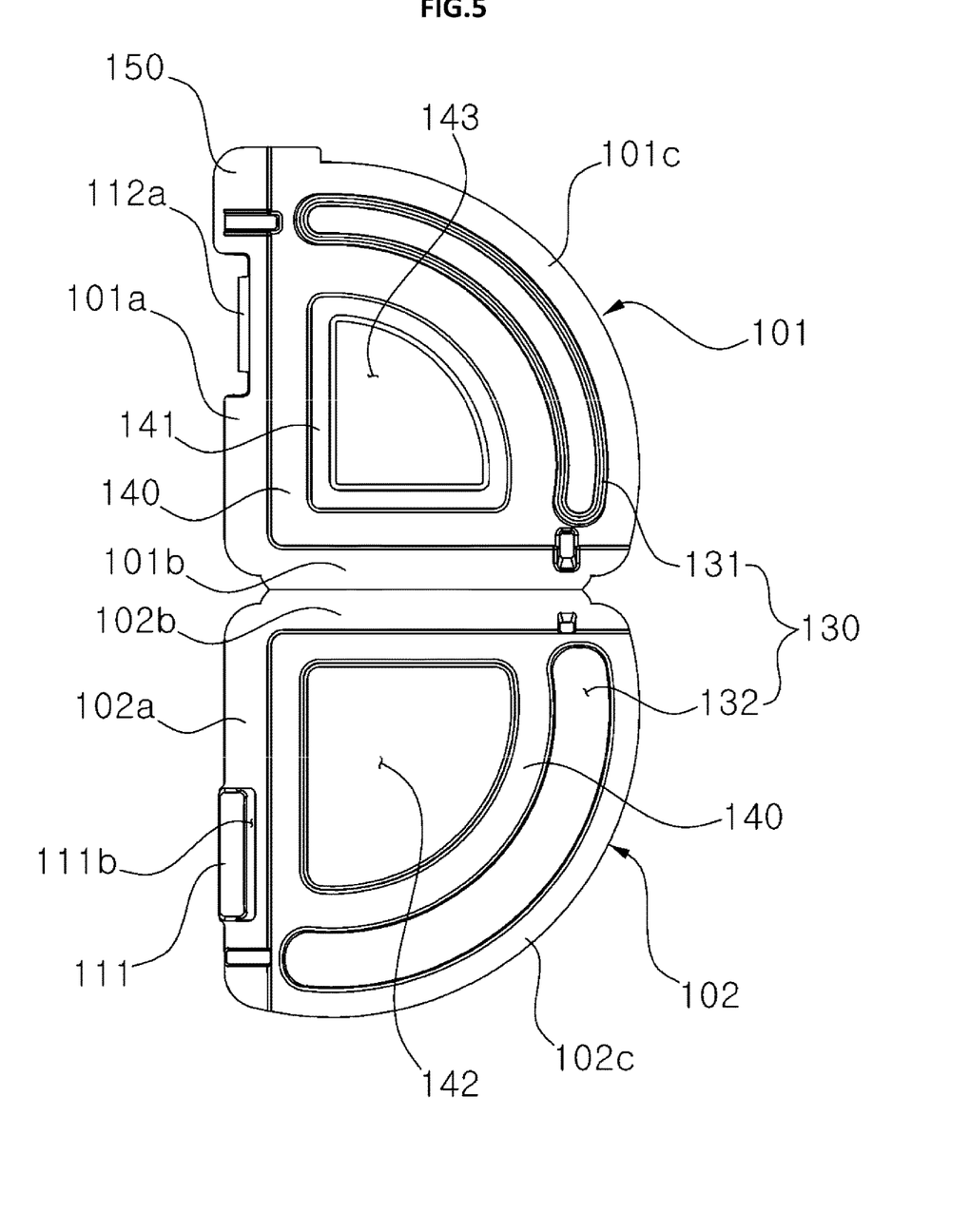
FIG. 5 is a plan view illustrating the tongs of FIG. 3 when the tongs are unfolded.

FIG. 2 is a figure illustrating another use of tongs for sealing an opening of a bag according to an example embodiment of the present invention. FIG. 3 is a perspective view illustrating the tongs of FIGS. 1 and 2. FIG. 4 is a perspective view illustrating the tongs of FIG. 3 when the tongs are opened. FIG. 5 is a plan view illustrating the tongs of FIG. 3 when the tongs are unfolded Referring to FIGS. 2 to 5, the tongs 100 includes a first body 101 and a second body 102. The tongs 100 may further include a sealing part 130 and a locking part 110.

The first body 101 has a first side 101a, a second side 101b and a third side 101c connecting the first side 101a to the second side 101b, and the second body 102 has a first side 102a, a second side 102b and a third side 102c connecting the first side 102a to the second side 102b.

The first body 101 and the second body 102 are combined with each other configured to cover a surface and an opposite surface of the bag 200. Accordingly, the tong 100 covers and seals the opening of the bag 200. Here, the opening of the bag 200 is located inside of the second body 102, and then the first body 101 is combined with the second body 102, so that the opening of the bag 200 is covered and sealed, and the bag 200 is fixed between the first body 101 and the second body 102.

The first body 101 and the second body 102 may have Symmetrical form, but it is not limited thereto, the first body 101 and the second body 102 may have different shapes. For example, although not shown in figures, the second body 102 may have larger shape than that of the first body 101. Here, is possible that the opening of the bag 200 is located inside of the second body 102, and then the first body 101 is combined with the second body 102 to seal the opening of the bag 200. Although, hereinafter, for convenience of explanation, example embodiment having the first body 101 and the second body 102 which have corresponding shape is explained.

The first side of Each of the first body 101 and the second body 102 is located along a length direction of a first side (no reference mark in the figure) of the bag 200, and each of the second side is located along a length direction of a second side (no reference mark in the figure) of the bag 200 to nip the bag 200. Here, the first side and the second side of each of the first body 101 and the second body 102 may be formed perpendicular to each other. Accordingly, like in FIG. 1, the tongs 100 is overall located at the edge of the bag 200 to cover and seal the opening, so that the exterior of the tong 100 is formed along the upper boundary and the left boundary of the bag 200 the bag 200, so that aesthetics and portability may be improved.

In addition, the third side of each of the first body 101 and the second body 102 may be a curve. However, it is not limited thereto, the third side may have various shapes. For example, the third side of each of the first body 101 and the second body 102 may be a straight line. In addition, the third side of each of the first body 101 and the second body 102 may have at least one or more of bending portion. Each of the first body 101 and the second body 102 has a right-angled triangle shape, and an oblique side of the right-angled triangle shape may be protruded configured to have predetermined area or recessed. For example, the first body 101 and the second body 102 may have overall a right-angled triangle shape, a sector form, a rectangle, and various other forms. Detailed explanation about this will be mentioned later, in the present example embodiment, the first body 101 and the second body 102 have overall sector form.

Each of the first body 101 and the second body 102 has a first side 101a, 102a, a second side 101b, 102b, and a third side 101c, 102c. Each of the first side 101a, 102a and the second side 101b, 102b are perpendicular to each other. Each of the third side 101c, 102c forms an arc, so that the first body 101 and the second body 102 have overall sector form.

Each of the first body 101 and the second body 102 has a recess portion 140 which forms a stepped portion to each of the first side 101a, 102a and the second side 101b, 102b. Here, the second body 102 has a stepped portion 144 formed between the recess portion 140 and the first side 102a and between the recess portion 140 and the second side 102b. When the bag is located on the second body 102, a first side and a second side of the bag 200 makes contact with the stepped portion 144 of the second body 102, so that the bag 200 may be located on an exact position. The recess portion 140 of the first body 101 may receive some of contents leaked from the opening of the bag 200.

As the recess portion is formed at the first body 101 and the second body 102, when the first body 101 and the second body 102 are combined to each other to seal the bag 200, a gap 103 may be formed between the third side 101c of the first body 101 and the third side 102c of the second body 102. In this case, to open the first body 101 and the second body 102, user may insert his finger tip into the gap 103, and pull the first body 101 and the second body 102 in opposite direction, so that the first body 101 and the second body 102 may be easily opened.

According to another example embodiment to easily open the first body 101 and the second body 102, a handle part may be formed at the first body 101 or the second body 102. Here, the handle part may extend outward to have predetermined area at the first body 101 or the second body 102. As described in the figures, the handle part 150 may have L shape extending from the first side 101a and the second side 102a of the first body 101.

In addition, the second body 102 may have a receiving groove 142 configured to receive leaked contents through the opening of the bag 200. The first body 101 may have a protrusion wall 141 corresponding to the receiving groove 142 of the second body 102 and an area 143 defined by the protrusion wall 141. Detailed explanation about this will be mentioned later.

The first body 101 and the second body 102 may be provided with being separated from each other, or may be connected or combined with each other configured to be rotated to each other. In this case, the second side 101b of the first body 101 and the second side 102b of the second body can be rotatably connected or combined with each other. The bag 200 may be sealed by locating the bag 200 on the second body 102 and then fold the first body 101 to the second body 102. Although the second side 101b of the first body 101 and the second side 102b of the second body is rotatably connected with each other, so that the first body 101 and the second body 102 are unitary formed in FIGS. 3 to 5, it is not limited thereto. For example, although not shown in the figures, the first body and the second body may be removably connected with each other by a hinge. In this case, the first body and the second body can be separated individually, and conveniently washed. The hinge may be formed by a synthetic resin such as ABS or PP. Note that, the first body 101 and the second body 102 may be formed various material for example, the synthetic resin, but it is not limited thereto.

The sealing part 130 between the first body 101 and the second body 102 has a function to push and seal the bag 200. The sealing part 130 may include a sealing protrusion 131 formed on a surface of the first body 101, and a sealing groove 132 formed on a surface of the second body 102. The sealing protrusion 131 and the sealing groove 132 are formed to opposite to each other when the first body 101 and the second body 102 are combined, and the sealing protrusion 131 is inserted into the sealing groove 132. In this case, concave and convex structure of the sealing protrusion 131 and the sealing groove 132 may bend the bag 200 to improve sealing force. A plurality of the sealing protrusions 131 and a plurality of the sealing grooves 132 may be formed.

In addition, each of the sealing protrusion 131 and the sealing groove 132 may extend along a length direction of the third side 101c and 102c of the first body 101 and the second body 102. For example, as described in FIGS. 4 and 5, each of the sealing protrusion 131 and the sealing groove 132 may have an arc shape extending along the length direction of the third side 101c and 102c of the first body 101 and the second body 102.

At least one or more of the sealing protrusion 131 may be formed. For example, a plurality of the sealing protrusions 131 having an arc shape and spaced apart from each other may be formed. In some example embodiment, the sealing protrusion 131 may have belt shape like described in FIGS. 4 and 5. When the sealing protrusion 131 has the belt shape, portions of the sealing protrusion 131 which are spaced apart from each other may press the bag 200, so that sealing force may be improved. Similarly, the sealing protrusion 131 has a plurality of portions.

Although not shown in figures, a sealing member formed of silicon, urethane, rubber and etc may be attached on an end of the sealing protrusion 131 or a bottom surface of the sealing groove 132. The sealing member may improve adhesion between the sealing protrusion 131 and the sealing groove 132, so that the bag may be press the bag harder. Thus, sealing force of the opening may be improved. The sealing member may be attached on both of the end of the sealing protrusion 131 and the bottom surface of the sealing groove 132. Furthermore, the sealing member may be attached on entire of inside surfaces of the first body 101 and the second body 102, so that the adhesion between the first body 101 and the second body 102 may be improved.

In addition, although the opening of the bag 200 is sealed by the sealing part 130, contents may be leaked through the opening. Thus, receiving means to receive the leaked contents is necessary. For this, the second body 102 may have a receiving groove 142, and the receiving groove 142 may be formed between the first and second side 102a and 102b of the second body 102 and the sealing groove 132. When the recess portion 140 is formed on the second body 102, the receiving groove 142 is formed at the recess portion 140. Accordingly, small amount of leaked contents from the opening of the bag 200 can be received in the receiving groove 142 of the second body 102, so that the contents is not leaked outside of the first body 101 and the second body 102.

In addition, the first body 101 may have the area 143 having a specific size formed opposite to the receiving groove 142 of the second body 102. The small amount of leaked contents from the opening of the bag 200 may also be received at the area 143 like the receiving groove 142 of the second body 102. The area 143 may be formed by a protrusion wall 141 formed on an inner surface of the first body 101.

In addition, outer surface of the protrusion wall 141 of the first body 101 may be inserted in the receiving groove 142 of the second body 102 configured to make contact with an inner side of the receiving groove 142. In this case, the leaked contents from the opening of the bag 200 may be received in the area 143 of the first body 101, so that the contents is not easily leaked to outside, and combining force of the first body 101 and the second body 102 may be improved.

Note that, although the contents are leaked from the opening of the bag 200, the area 143 of the first body 101 and the receiving groove 142 of the second body 102 receives the leaked contents. Thus user may clean only these areas, so that the first body 101 and the second body 102 can be managed easily and cleanly.

The locking part 110 may protect the first body 101 and the second body 102 which are combined together to seal the opening of the bag 200 from being separation of the first body 101 and the second body 102. The locking part 110 may include a locking bump and a locking groove. The locking bump may be formed at the first or second body. The locking groove may be formed at the second or first body.

For example, as described in FIGS. 3 to 5, the locking bump 111 may be protruded from the first side 102a of the second body 102, and the locking groove 112 may be formed at the first side 101a of the first body 101 configured to engage to the locking bump 111. In this case, the locking bump 111 may have a hanging jaw 111a protruded in a direction which crosses protrusion direction of the locking bump 111, and the locking groove 112 may have a hanging bump 112a. When the first body 101 is rotated toward the second body 102, then the hanging bump 112a of the locking groove 112 makes contact with the hanging jaw 111a of the locking bump 111. And then external force may be applied thereto, the hanging bump 112a of the locking groove 112 may be move downward along a surface of the hanging jaw 111a of the locking bump 111, and then the locking bump 111 is elastically deformed outward, and then the first body 101 and the second body 102 may completely contact with each other, and then the hanging bump 112a of the locking groove 112 is combined with the hanging jaw 111a of the locking bump 111. Thus, the first body 101 and the second body 102 may maintain combination condition. In this case, a surface of the hanging jaw 111a of the locking bump 111 and a surface of the hanging bump 112a of the locking groove 112 which makes contact with the surface of the hanging jaw 111a may be inclined surface. Accordingly, they may be easily combined to each other. In addition, a through hole 111b may be formed at the second body 102 adjacent to the locking bump 111, so that elastic deformation of the locking bump 111 can be easier.

The locking part 110 may have various structures. For example, although not shown is the figures, the locking part may have a magnet formed at the first body 101 or the second body 102, and a magnetic body formed the second body 102 or the first body 101. The magnet and the magnetic body may be overlapped with each other when the first body 101 and the second body 102 are closed. In some example embodiment, the locking part may have a protrusion formed on the first body 101 and a protrusion formed on the second body 102, the protrusions may be staggered engaged with each other, so that the first body and the second body may be combined.

Figure 6:
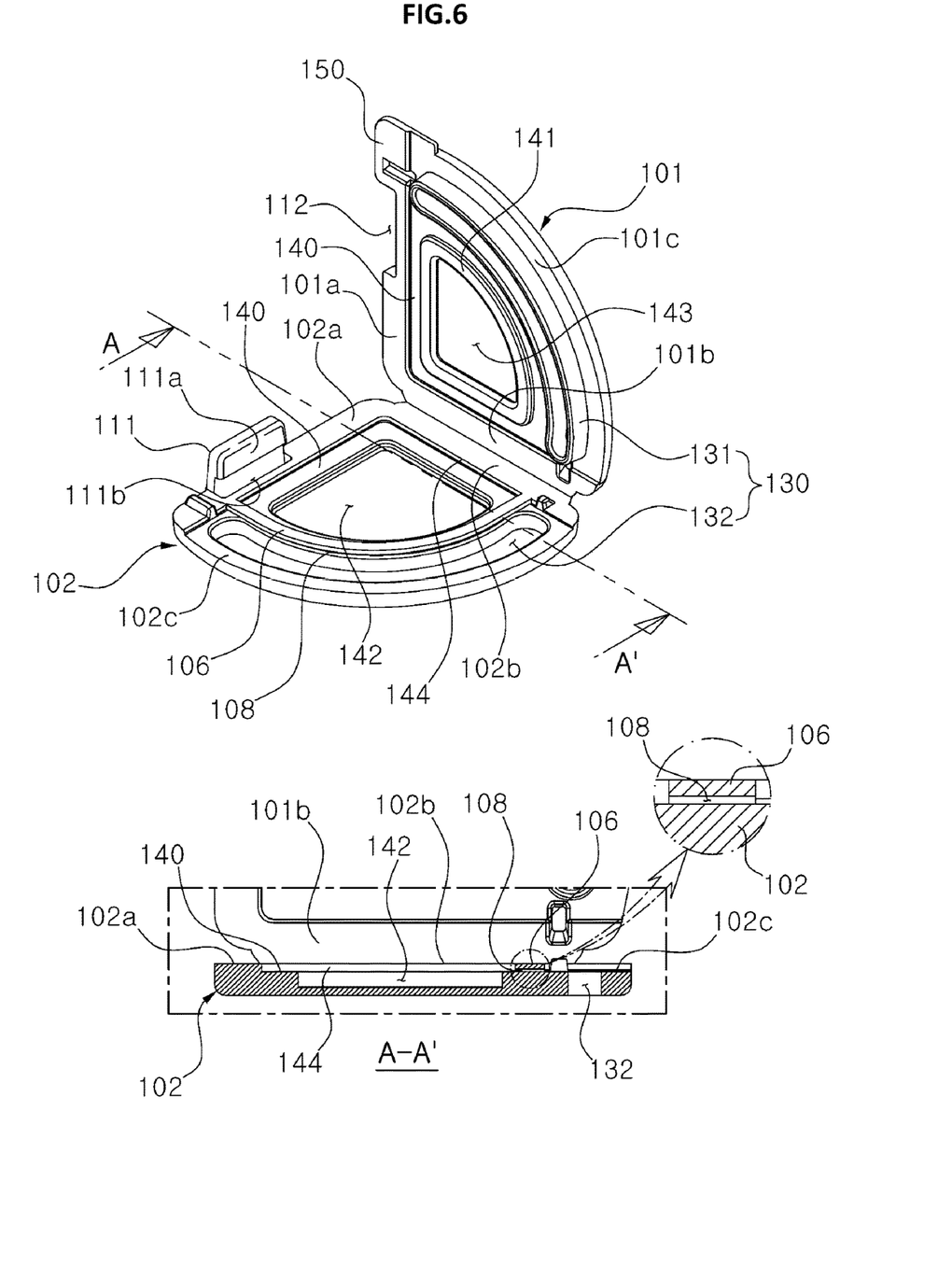
FIG. 6 is a perspective view and a cross-sectional view illustrating tongs for sealing an opening of a bag according to an example embodiment of the present invention when the tongs are opened.

FIG. 6 is a perspective view and a cross-sectional view illustrating tongs for sealing an opening of a bag according to an example embodiment of the present invention when the tongs are opened. As described in FIG. 6, the tongs 100 is substantially same as the tongs in FIGS. 3 to 5, except for further including a guide member 106 which guide insert of the bag. Other configurations except for the guide member 106 are the same as the description of the configuration of the thongs of FIGS. 3 to 5, so a detailed description for the same configuration will be omitted below.

The guide member 106 may be formed at the second body 102. More specifically, the guide member 106 may be formed between the sealing groove 132 of the second body 102 and the receiving groove 142. The guide member 106 may be formed over the partitioning wall (no reference numeral) which comparts the sealing groove 132 and the receiving groove 142, and the guide member 106 may be formed spaced apart from a predetermined distance from an upper surface of the partitioning wall. Here, the guide member 106 may be formed corresponding to the portioning wall in a plan view. The bag may be inserted through a space 108 between the guide member 106 and the portioning wall 106.

As described above, the second body 102 may have the recess portion 140. Accordingly, the second body 102 has the stepped portion 144. The bag 200 put on the second body 102 may make contact with the stepped portion 144 of the second body 102, so that the bag 200 may be placed correctly, but it is not possible to prevent movement of the bag 200 to upper side. The guide member 106 may solve the problem. Thus, the guide member 106 may provide insertion path of the bag 200 by forming the space 108 between the portioning wall and the guide member 106, and may prevent the bag 200 from moving to upper side when the bag 200 is inserted in the space 108.

Figure 7:
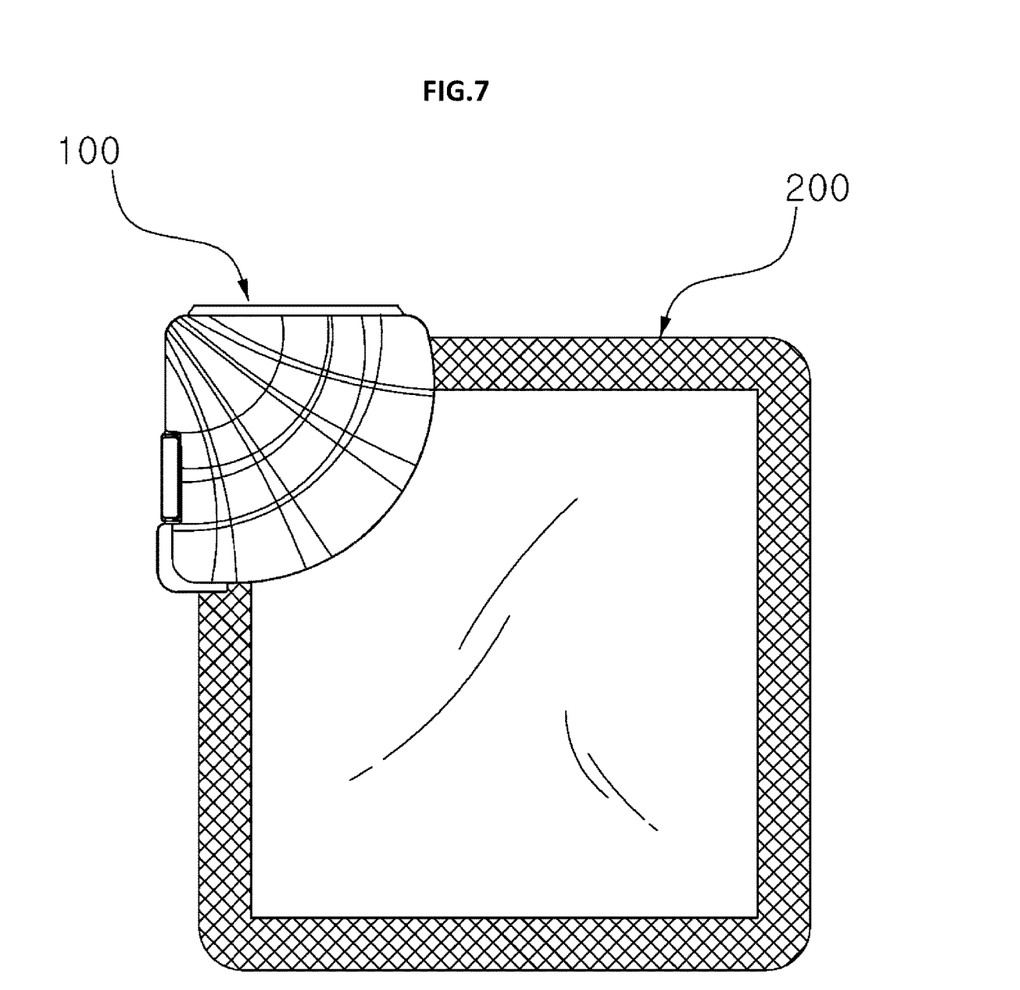
FIGS. 7 and 8 are figures illustrating tongs for sealing an opening of a bag according to an example embodiment of the present invention.
Figure 8:
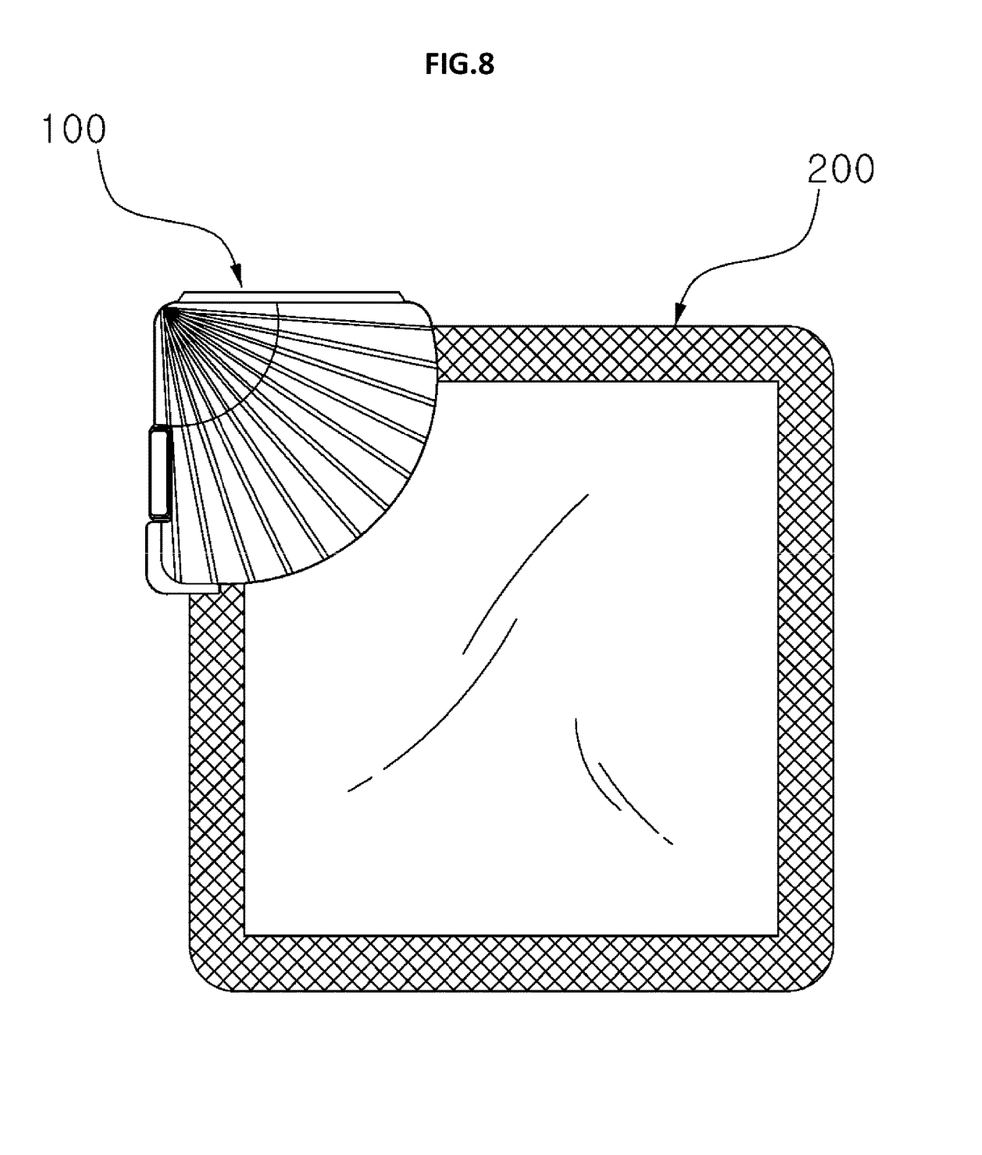

FIGS. 7 and 8 are figures illustrating tongs for sealing an opening of a bag according to an example embodiment of the present invention. The tongs 100 may have various shapes for example a sector form and etc. In addition, outer surface of the tongs 100 may have various shapes. For example, as described in FIG. 7, the tongs 100 may have a shall shape which having wrinkles on outer surface, or have fan spoke image on the outer surface of the tong 100 as described in FIG. 8. In addition, various designed image may be formed on the outer surface of the tongs 100, so that it may be looks like a specific object is engaged at the edge of the bag.

Figure 9:
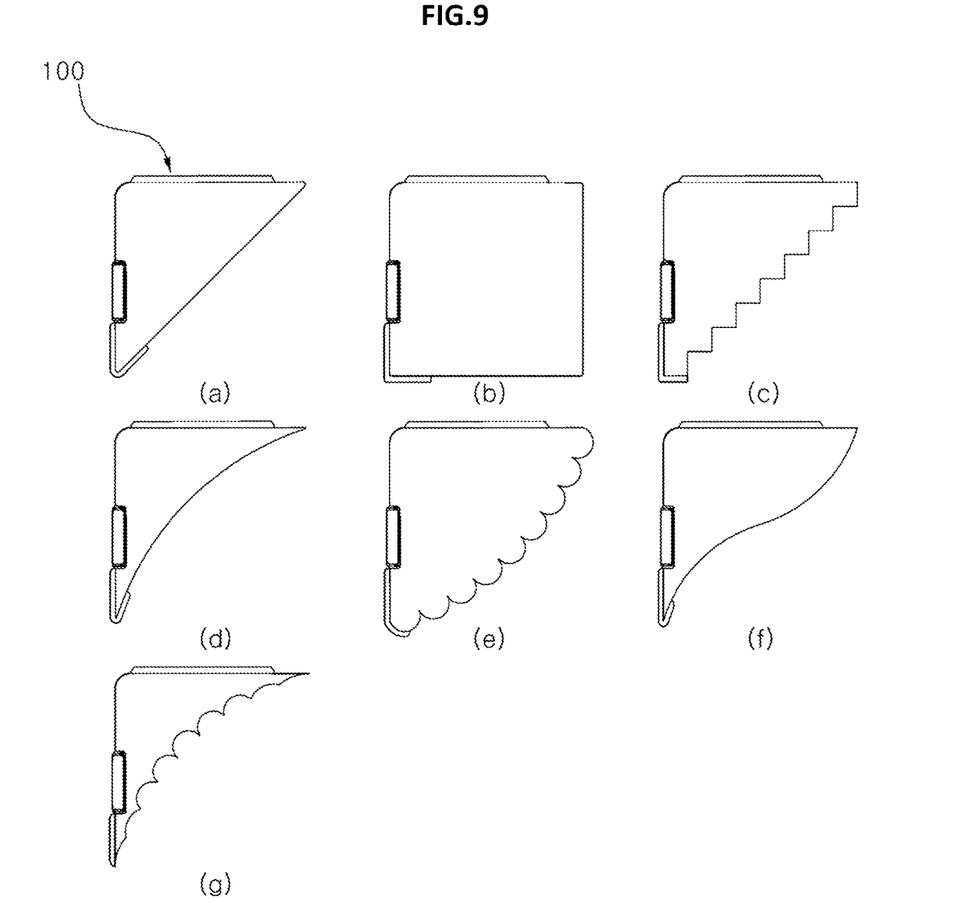
FIG. 9 is conceptual views illustrating tongs for sealing an opening of a bag according to other example embodiments of the present invention.

FIG. 9 is conceptual views illustrating tongs for sealing an opening of a bag according to other example embodiments of the present invention. As described in the figures, each of the first body and the second body has a right-angled triangle shape, and an oblique side of the right-angled triangle shape may be protruded configured to have predetermined area or recessed.

For example, as described in (a) of FIG. 9, the first body and the second body may have a right-angled triangle shape. A third side of each of the first and second bodies is straight line.

Referring to (b) of FIG. 9, the first and second body have a right-angled triangle shape, and the oblige side of the right-angled triangle shape is protruded to have a predetermined area, so that the predetermined area forms a right-angled triangle shape. Thus, the first and second bodies have a quadrangle shape. This means, the third side of each of the first body and the second body is a straight line having one bent portion (no reference numeral in the figure).

Referring to (c) of FIG. 9, the first and second body have a right-angled triangle shape, and the oblige side of the right-angled triangle shape is protruded to have a specific shape, and the protruded area forms a step shape. This means, the third side of each of the first body and the second body is a straight line having a plurality of bent portions.

Referring to (d) of FIG. 9, the first and second body have a right-angled triangle shape, and the oblige side of the right-angled triangle shape is recessed by a predetermined area. This means, the third side of each of the first body and the second body is a curved line.

Referring to (e) of FIG. 9, the first and second body have a right-angled triangle shape, and the oblige side of the right-angled triangle shape is protruded to have predetermined area, the first and second body overall has a sector form, and a plurality of half circles are protruded from an arc of the sector form. This means, the third side of each of the first body and the second body is a curved line having a plurality of bending portions.

Referring to (f) of FIG. 9, the first and second body have a right-angled triangle shape, and the oblige side of the right-angled triangle shape is protruded and recessed to have predetermined area, the protruded portion has a wave form. This means, the third side of each of the first body and the second body is a curved line.

Referring to (g) of FIG. 9, the first and second body have a right-angled triangle shape, and the oblige side of the right-angled triangle shape is recessed by a predetermined area, and a plurality of grooves may be formed thereon. This means, the third side of each of the first body and the second body is a curved line having a plurality of bent portions.

Figure 10:
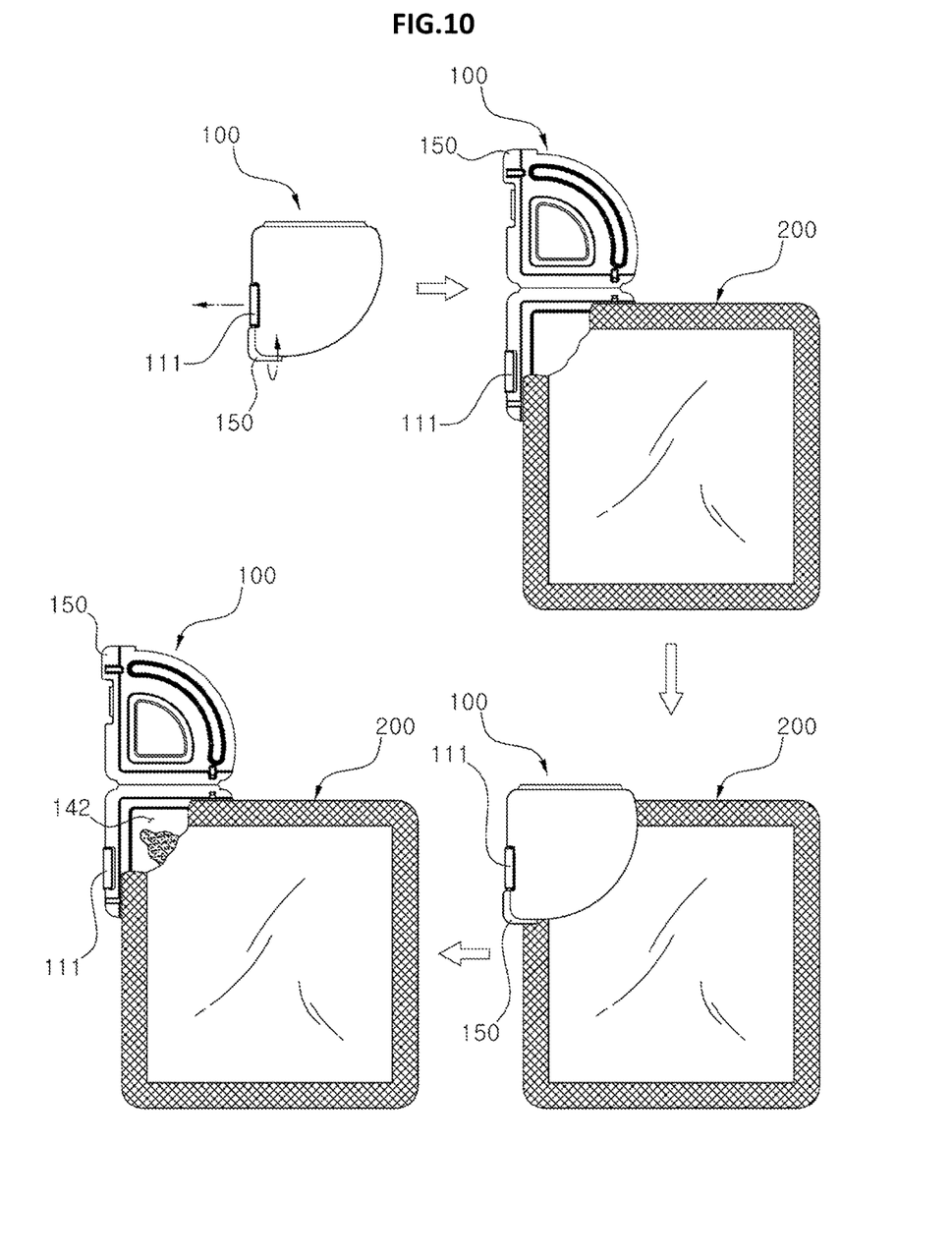
FIG. 10 is a figure illustrating process of sealing or opening an opening of a bag using tongs for sealing the opening of the bag according to an example embodiment of the present invention.

FIG. 10 is a figure illustrating process of sealing or opening an opening of a bag using tongs for sealing the opening of the bag according to an example embodiment of the present invention. As described above, to open the tongs 100, user may hold the locking bump 111 and the handle part 150, and then pull the locking bump 111 in a left direction and push the handle part 150 upward. And then, user may put the opening of the bag 200 on the second body, and then rotate the first body to combine with the second body, so that the opening of the 200 is covered and sealed. When the user want to use is again, the user may open the tongs 100 as described above. Here, although the contents leaked out from the bag 200, the leaked contents may be received in the receiving groove 142 of the second body, so that leakage of the contents outside of the tongs 100 may be prevented.

Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims.

According to an example embodiment of the present invention, the tongs is configured to seal the bag and has a shape corresponding to an edge of the bag, so that a portion of the tongs which is exposed to outside may be minimized.

In addition, according to an example embodiment of the present invention, the opening of the g may be easily sealed or opened.

In addition, according to an example embodiment of the present invention, the sealing part may bend and press the bag, so that sealing force for sealing the opening of the bag may be improved.

In addition, according to an example embodiment of the present invention, the sealing part may have a curved shape, so that the tongs may seal the opening of the bag which is formed in the middle of the bag, as well as the opening formed at the edge of the bag.

In addition, according to an example embodiment of the present invention, the locking part may prevent unwanted opening of the tongs, and may improve the sealing force.

In addition, according to an example embodiment of the present invention, the space for receiving the leaked contents, so that although the contents are leaked from the opening of the bag, the tongs may prevent leakage of the contents outside and may be easily cleared.

In addition, according to an example embodiment of the present invention, the guide member may prevent movement of the bag after the bag inserted.

In addition, according to an example embodiment of the present invention, the stepped portion is formed at the inner side of the second body, so that the bag may be correctly located.

The invention claimed is:

1. Tongs for sealing an opening of a bag, comprising:
   a first body having a first side, a second side and a third side connecting the first and second side, the first side and the second side perpendicular to each other;
   a second body having a first side, a second side and a third side connecting the first and second side, the first side and the second side perpendicular to each other;
   a sealing part disposed between the first body and the second body, the sealing part configured to press the bag, the sealing part comprising:
   at least one sealing protrusion formed along a length direction of the third side of the first body on a surface of the first body; and a sealing groove formed along a length direction of the third side of the second body on a surface of the second body, the sealing groove receiving the at least one sealing protrusion when the first body and the second body are combined, wherein the first body and the second body are configured to be combined with each other, and the first body and the second body cover a surface and an opposite surface of the bag to seal the opening of the bag when the first body and the second body are combined with each other; and wherein the second side of the first body and the second side of the second body are connected to each other, and the first body is rotatable relative to the second body around a borderline between the second side of the first body and the second side of the second body.

2. The tongs of claim 1, wherein the first side of each of the first and second bodies is located in parallel with a length direction of a first side of the bag, and the second side of each of the first and second bodies is located in parallel with a length direction of a second side of the bag, when the tongs nip the bag.

3. The tongs of claim 1, wherein the third side of each of the first and second bodies is a straight line.

4. The tongs of claim 3, wherein the third side of each of the first and second bodies has at least one bent portion.

5. The tongs of claim 1, wherein the third side of each of the first and second bodies is a curved line.

6. The tongs of claim 1, wherein each of the third side of the first and second bodies is protruded or recessed.

7. The tongs of claim 1, wherein the at least one sealing protrusion is belt-shaped.

8. The tongs of claim 1, wherein the second body has a receiving groove formed between the first and second sides and the sealing groove, and the receiving groove is configured to receive contents which are leaked from the opening of the bag.

9. The tongs of claim 8, wherein the first body has an area which is opposite to the receiving groove and is formed by a protrusion wall on the first body.

10. The tongs of claim 9, wherein an outer surface of the protrusion wall of the first body makes contact with an inner surface of the receiving groove of the second body when the protrusion wall is inserted in the receiving groove.

11. The tongs of claim 1, wherein the second body has a recess portion which forms a stepped portion with the first and second bodies.

12. The tongs of claim 1, wherein when the first body and the second body are combined to seal the bag, a gap is formed between the third side of the first body and the third side of the second body.

13. The Tongs of claim 1, further comprising a locking part to prevent unwanted separation of the first and second body, wherein the locking part comprises locking bump formed at the first or second body, and a locking groove formed at the second or first body to engage with the locking bump.

14. The Tongs of claim 13, wherein the first or second body has a handle part extending outwards from the first or second body.

15. Tongs for sealing an opening of a bag, comprising:
a first body having a first side, a second side and a third side connecting the first and second side;
a second body having a first side, a second side and a third side connecting the first and second side, the first side and the second side perpendicular to each other;
a sealing part disposed between the first body and the second body, the sealing part configured to press the bag, the sealing part comprising:
at least one sealing protrusion on a surface of the first body; and
a sealing groove formed on a surface of the second body, the sealing groove receiving the at least one sealing protrusion when the first body and the second body are combined,
wherein the first body and the second body are configured to be combined with each other, and the first body and the second body cover a surface and an opposite surface of the bag to seal the opening of the bag when the first body and the second body are combined with each other; and
wherein the second body has a receiving groove formed between the first and second sides and the sealing groove, the receiving groove is configured to receive contents which are leaked from the opening of the bag;
wherein the first body has an area which is opposite to the receiving groove and is formed by a protrusion wall on the first body; and
wherein an outer surface of the protrusion wall of the first body makes contact with an inner surface of the receiving groove of the second body when the protrusion wall is inserted in the receiving groove.

* * * * *